(12) United States Patent
Lang et al.

(10) Patent No.: US 7,930,460 B2
(45) Date of Patent: Apr. 19, 2011

(54) UNIVERSAL MEASUREMENT OR PROTECTIVE DEVICE

(75) Inventors: Gerhard Lang, Wilhelmshorst (DE); Götz Neumann, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 380 days.

(21) Appl. No.: 11/916,364

(22) PCT Filed: Jun. 1, 2005

(86) PCT No.: PCT/DE2005/001004
§ 371 (c)(1),
(2), (4) Date: Dec. 3, 2007

(87) PCT Pub. No.: WO2006/128394
PCT Pub. Date: Dec. 7, 2006

(65) Prior Publication Data
US 2009/0024780 A1    Jan. 22, 2009

(51) Int. Cl.
*G06F 13/14* (2006.01)
(52) U.S. Cl. .................. 710/305; 710/306
(58) Field of Classification Search .......... 710/60, 710/61, 69, 110, 305, 306, 314, 315; 340/508, 340/511, 870.11, 870.21
See application file for complete search history.

(56) References Cited

U.S. PATENT DOCUMENTS

| | | | |
|---|---|---|---|
| 6,832,169 B2 * | 12/2004 | Wakida et al. ............ 702/62 |
| 2002/0064157 A1 | 5/2002 | Krause | |
| 2002/0103946 A1 * | 8/2002 | Gaiser ........................ 710/11 |
| 2002/0183863 A1 * | 12/2002 | Eryurek ........................ 700/2 |
| 2003/0011491 A1 * | 1/2003 | Winkler ................ 340/870.07 |
| 2003/0023795 A1 * | 1/2003 | Packwood et al. ............ 710/105 |
| 2004/0205111 A1 * | 10/2004 | Chasmawala et al. ....... 709/201 |
| 2004/0249982 A1 | 12/2004 | Arnold et al. | |
| 2008/0154388 A1 * | 6/2008 | Kramer et al. .................. 700/9 |
| 2008/0288933 A1 * | 11/2008 | Budmiger et al. ............ 717/168 |
| 2010/0002348 A1 * | 1/2010 | Donolo et al. ................. 361/64 |

FOREIGN PATENT DOCUMENTS

| | | |
|---|---|---|
| CN | 1476702 A | 2/2004 |
| DE | 10058524 A1 | 6/2002 |
| DE | 10147422 A1 | 4/2003 |
| DE | 10260806 A1 | 7/2004 |
| EP | 1388238 A1 | 2/2004 |
| EP | 1430628 B1 | 2/2005 |
| JP | 2004515122 T | 5/2004 |
| WO | 0243336 A1 | 5/2002 |
| WO | 03028259 A1 | 4/2003 |

OTHER PUBLICATIONS

IEC 61850 Distributed Analog Values Applications in Substation Automation Systems, Apostolov, IEEE, 2005.*
IEC 61850, <http://en.wikipedia.org/wiki/IEC_61850>, accessed on May 3, 2010.*

* cited by examiner

*Primary Examiner* — Khanh Dang
(74) *Attorney, Agent, or Firm* — Laurence A. Greenberg; Werner H. Stemer; Ralph E. Locher

(57) ABSTRACT

A measurement or protective device has an interface for establishing a connection to at least one measurement transducer and a further interface for connecting to a superordinate data bus. In order to allow the measurement or protective device to be used in a particularly universal manner and to make it possible for complex protective systems to be constructed in a particularly cost-effective manner, a communication unit is provided in the measurement or protective device. The communication unit is connected to both interfaces, can be directly connected to the measurement transducer via the interface, can be connected to the superordinate data bus via the further interface, forms messages and transmits them to the superordinate data bus.

31 Claims, 2 Drawing Sheets

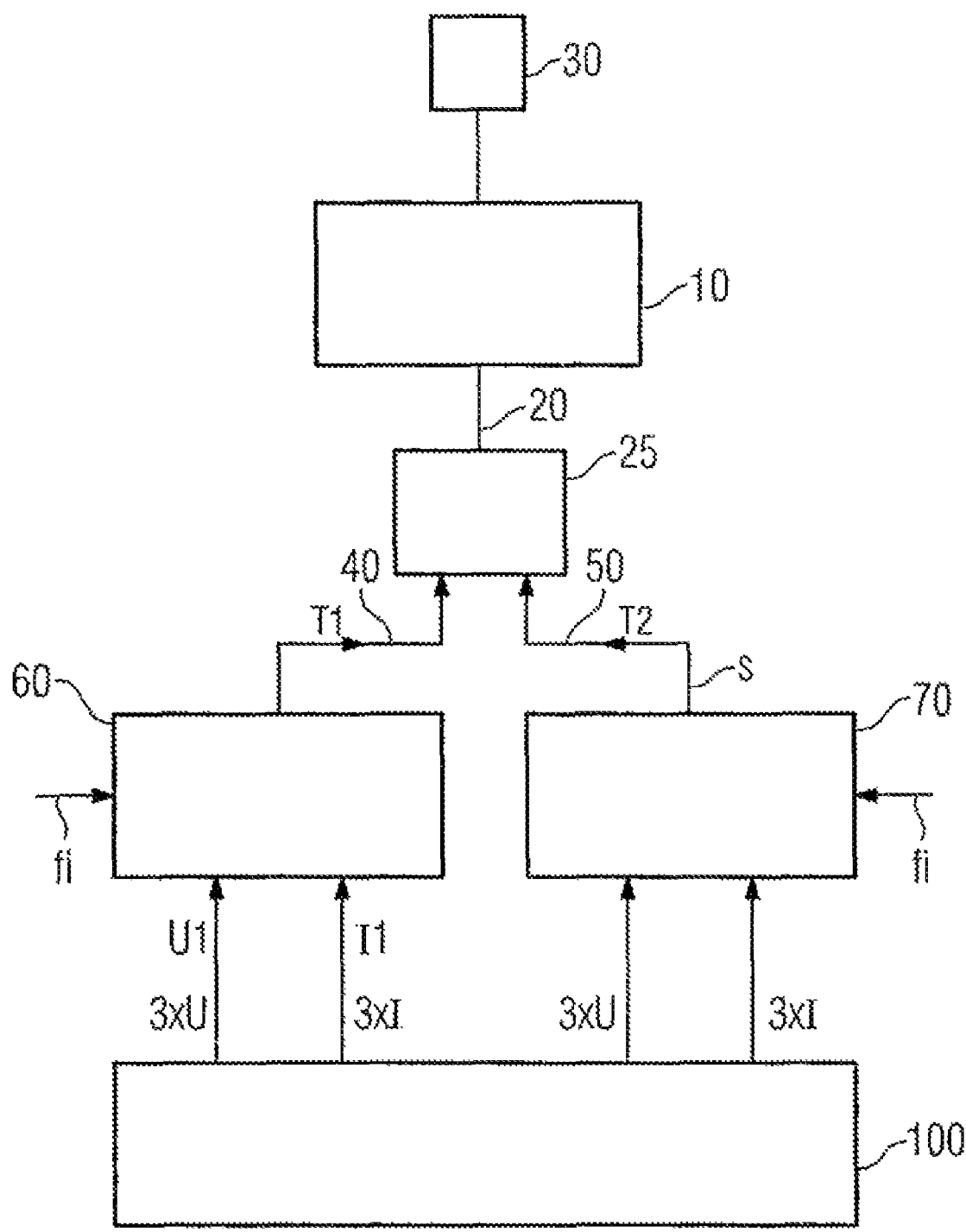

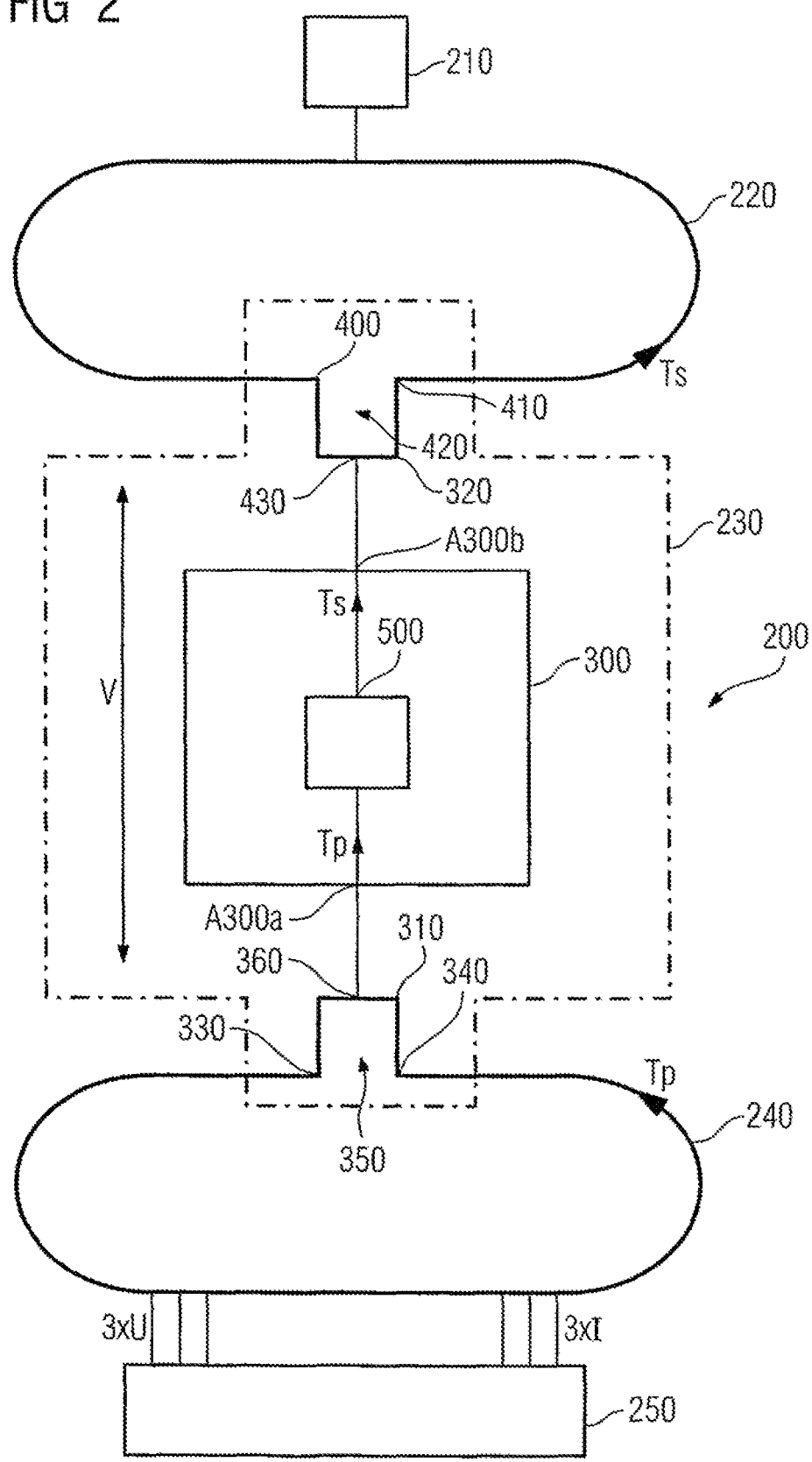

UNIVERSAL MEASUREMENT OR PROTECTIVE DEVICE

BACKGROUND OF THE INVENTION

Field of the Invention

The invention relates to a measurement or protective device having an interface which is suitable for establishing a connection to at least one measurement transducer and a further interface which is suitable for connection to a superordinate data bus.

Such measurement or protective devices are known in the field of electrical protective technology. These previously known measurement or protective devices are not connected to measurement transducers directly but rather via so-called "merging units" and switches (for example Ethernet switches). The function of the "merging units" is to process phase-conductor-related samples from the measurement transducers and to use them to form data messages which can be processed further by the respective measurement or protective device. As the name already implies, the phase-conductor-related samples relate to current and/or voltage in the phase conductors of an electrical system which are assigned to the respective measurement transducer.

BRIEF SUMMARY OF THE INVENTION

The invention is based on the object of specifying a measurement or protective device which can be used in a particularly universal manner and makes it possible to construct complex protective systems in a particularly cost-effective manner.

According to the invention, this object is achieved by means of a measurement or protective device having the features as claimed in claim 1. Advantageous refinements of the measurement or protective device according to the invention are specified in subclaims.

According to this, the invention provides for the measurement or protective device to contain a communication unit which is connected to the two interfaces, can be directly connected to the measurement transducer by means of one interface, can be directly connected to the superordinate data bus by means of the further interface, uses phase-conductor-related samples from the measurement transducer to form sampling-time-related messages and transmits the latter to the superordinate data bus and thus provides them for further consumers.

A fundamental advantage of the measurement or protective device according to the invention can be seen in the fact that it enables direct connection both to a superordinate data bus and to one or more measurement transducers. The direct connection of the measurement or protective device is made possible by the communication unit according to the invention which is capable of directly processing the phase-conductor-related samples from the measurement transducer and using them to form sampling-time-related messages. In other words, in the measurement or protective device according to the invention, the function of the physically separate "merging units" and "switches" mentioned in connection with the previously known prior art has been moved to the communication unit, with the result that, in contrast to the prior art, the measurement or protective device according to the invention allows direct connection to measurement transducers.

One advantageous refinement of the measurement or protective device provides for the two interfaces to form data bus interfaces; for example, one interface is suitable for connection to a process bus and the further interface is suitable for connection to a station bus.

It is considered to be particularly advantageous if the measurement or protective device has two 3-port network connections each having two external ports and one internal port, the two external ports of one 3-port network connection forming one interface and the two external ports of the other 3-port network connection forming the other interface, and the two internal ports of the two 3-port network connections being connected to the communication unit. On account of the two external ports, 3-port network connections enable full-duplex operation of the data bus, thus achieving a particularly high level of fault tolerance. Suitable 3-port network connections are described, for example, in the German laid-open specification DE 102 60 806 A1. The two external ports of one network connection are preferably suitable for direct connection to a process bus and the two external ports of the other network connection are preferably suitable for direct connection to a station bus.

The measurement or protective device can be produced in a particularly cost-effective manner if the communication unit and the two network connections are integrated, for example monolithically, in a freely programmable gate array.

The communication unit is preferably configured in such a manner that it uses the phase-conductor-related samples applied to the internal port of one network connection to form sampling-time-related messages and outputs the latter to the internal port of the other network connection.

The communication unit preferably reduces the sampling rate of the phase-conductor-related samples applied to the internal port of one network connection. For example, it uses the phase-conductor-related samples with their reduced sampling rate to form the sampling-time-related messages; alternatively, data reduction is carried out after the messages have been formed or while the messages are being formed.

By way of example, the communication unit is configured in such a manner that it reduces the sampling rate of the phase-conductor-related samples applied to the internal port of one network connection by using only every n-th sample further and leaving all remaining samples out of consideration, n being greater than two.

Alternatively, the communication unit may also be configured in such a manner that it uses the phase-conductor-related samples applied to the internal port of one network connection to form pointer values and uses the latter to form the sampling-time-related pointer messages.

For the rest, it is considered to be advantageous if the communication unit subjects the phase-conductor-related samples applied to the internal port of one network connection to a renewed sampling operation.

Such a "renewed" sampling operation can be carried out, for example, in such a manner that the communication unit uses the phase-conductor-related samples applied to the internal port of one network connection to reconstruct the temporal profile of the electrical signal (current or voltage of the respective phase conductor) sampled, resamples the reconstructed signal at a second sampling rate which differs from the original sampling rate, uses these new samples formed in this manner to form the messages and outputs the messages to the internal port of the other network connection.

The communication unit preferably has at least one digital signal processor for the purpose of forming the new samples.

In order to transmit the data, the two interfaces of the measurement or protective device preferably operate in accordance with the IEC 61850 standard; the sampling times are synchronized in accordance with the IEEE 1588 standard.

With regard to the information relating to the samples, the communication unit preferably forms the messages in accordance with the rules of the IEC 61850 standard. With regard to all other information, that is to say all information apart from the information relating to the samples, the communication unit preferably forms the messages in accordance with the IEC 61850-8-1 standard.

The process bus and the station bus preferably operate in accordance with a real-time Ethernet standard (cf. property rights and property right applications CN 1476702, DE 10058524, EP 1388238, JP 2004515122; US 2002064157; WO 200243336; DE 10147422; EP 1430628; US 2004249982; WO 2003028259); accordingly, the two network connections are each preferably suitable for connection to a real-time Ethernet ring.

The invention also relates to a protective system having a measurement or protective device, a measurement transducer and a superordinate control system.

As regards such a protective system, the invention is based on the object of achieving the possibility of particularly cost-effective implementation.

According to the invention, this object is achieved by means of a protective system having a measurement or protective device, a measurement transducer and a superordinate data bus, the two external ports of one 3-port network connection of the measurement or protective device being connected to the measurement transducer by means of a process bus, and the two external ports of another 3-port network connection of the measurement or protective device being connected to the superordinate control system by means of a station bus.

As regards the advantages of the protective system according to the invention, reference is made to the above statements in connection with the measurement or protective device according to the invention.

The invention is explained below using an exemplary embodiment; in the drawing

BRIEF DESCRIPTION OF THE SEVERAL VIEWS OF THE DRAWING

FIG. 1 shows a protective system having two measurement devices according to the prior art, and FIG. 2 shows one exemplary embodiment of a protective system according to the invention with one exemplary embodiment of a measurement and/or protective device according to the invention.

DESCRIPTION OF THE INVENTION

FIG. 1 shows a protective system according to the prior art. A protective device 10 which is connected to a superordinate data bus 30 can be seen. The protective device 10 is connected, by means of a data line 20, to an Ethernet switch (Ethernet message distributor) 25 which is also connected to "merging units" 60 and 70 by means of further data lines 40 and 50. The term "merging unit" is understood below as meaning devices which combine data—in this case current and voltage samples U and I—applied to the input side and forward them as data messages on the output side.

Both "merging units" 60 and 70 are each connected to six measurement transducers, to be precise to three respective current transducers and to three respective voltage transducers. The measurement transducers are visualized overall in FIG. 1 by a block 100.

The protective system according to FIG. 1 operates as follows:

The "merging unit" 60 receives phase-conductor-related samples U1 and I1 from the measurement transducers 100 and processes them to form data messages T1 which it transmits to the Ethernet switch 25 by means of the data line 40; the Ethernet switch 25 then forwards the data messages T1 to the protective device 10. The task of the "merging unit" 60 is to carry out a type of "data combination" in order to form the data messages T1. The data messages T1 formed in this manner are transmitted to the protective device 10 and are evaluated there. The protective device 10 then transmits the data messages T1 to the superordinate data bus 30 and thus to further consumers.

So that the two "merging units" 60 and 70 generate their data messages T1 and T2 in synchronism with one another, the two "merging units" 60 and 70 are each synchronized using synchronization pulses fi, additional devices which are not shown in FIG. 1 being required for this purpose.

In summary, in the protective system according to FIG. 1, it is not possible to directly connect the protective device 10 to the measurement transducers 100 since at least one "merging unit" and one Ethernet switch always have to be interposed between the protective device and the measurement transducer.

FIG. 2 illustrates one exemplary embodiment of a protective system 200 according to the invention. The protective system 200 has a superordinate control system 210 which is connected to a measurement and/or protective device 230 by means of a superordinate data bus 220 which is referred to below as a station bus. For reasons of clarity, the illustration according to FIG. 2 illustrates only a single measurement and/or protective device 230 of this type; it goes without saying that a plurality of measurement and/or protective devices 230 which receive and evaluate the messages on the station bus 220 can also be connected to the station bus 220.

The measurement and/or protective device 230 is also connected to a further data bus 240 which is referred to below as a process bus and makes it possible to connect the measurement and/or protective device 230 to one or more measurement transducers 250. The measurement transducers 250 are connected to phase conductors (not shown in FIG. 2) of an electrical system with a system frequency of 50 Hz or 60 Hz.

FIG. 2 also shows the internal structure of the measurement and/or protective device 230. A communication unit 300 which is connected to two 3-port network connections 310 and 320 which are physically contained in the measurement and/or protective device and are capable of full duplex operation can be seen. The 3-port network connections 310 and 320 may be, for example, those described in the German laid-open specification DE 102 60 806 A1.

One of the two 3-port network connections 310 has two external ports 330 and 340 which allow an interface 350 for connecting the measurement and/or protective device 230 to the process bus 240. The term "port" is thus to be understood as meaning an electrical bus connection or a bus interface. An internal port 360 of one 3-port network connection 310 is connected to a process-bus-side connection A300$a$ of the communication unit 300.

The further 3-port network connection 320 likewise has two external ports 400 and 410; these external ports 400 and 410 form an interface 420 for connecting the measurement and/or protective device 230 to the station bus 220. An internal port 430 of the further 3-port network connection 320 is connected to a station-bus-side connection A300$b$ of the communication unit 300.

The two 3-port network connections 310 and 320 and the communication unit 300 are shown in FIG. 2 as separate elements which are contained in the measurement and/or protective device 230. The two 3-port network connections 310 and 320 and the communication unit 300 are preferably formed by a single physical unit, preferably by a freely programmable gate array, for example a monolithically integrated array.

The protective system 200 according to FIG. 2 operates as follows:

The measurement transducers 250 generate phase-conductor-related samples U and I which are transmitted to the measurement and/or protective device 230 via the process bus 240. The phase-conductor-related samples U and I are transmitted on the process bus 240 in accordance with a real-time Ethernet method (cf. property rights and property right applications CN 1476702, DE 10058524, EP 1388238, JP 2004515122; US 2002064157; WO 200243336; DE 10147422; EP 1430628; US 2004249982; WO 2003028259) and in accordance with the IEC 61850 standard. Specifically, the samples U and I are transmitted in the form of messages Tp which are formed in accordance with the rules of the IEC 61850 standard. For the rest, that is to say with regard to data other than the samples, the messages are formed in accordance with the IEC 61850-8-1 standard.

The station bus 220 operates just like the process bus 240, that is to say likewise in accordance with a real-time Ethernet method and in accordance with the IEC 61850 standard. The two data buses 220 and 240 are each operated in the full duplex mode; this is possible since each of the two 3-port network connections 310 and 320 respectively has two output-side ports for connection to the respective data bus.

The messages containing the samples Tp are formed on the basis of a time clock which has a temporal accuracy of one microsecond.

When transmitting the samples U and I via the process bus 240, a time stamp (for example "sample counter" value) is respectively added to each sample. The "sample counter value" indicates the time slot for the seconds jump of the synchronization clock in which the respective phase-conductor-related sample has been formed. Since the bus clock is set precisely to one microsecond, the respective sampling time can be determined for each transmitted sample with an accuracy of one microsecond.

A multiplicity of phase-conductor-related samples U and I which have been determined at different points in time and accordingly contain different "sample counter values" arrive at the measurement and/or protective device 230. The measurement and/or protective device 230 sorts the phase-conductor-related samples U and I in accordance with their respective time slot or their respective "sample counter value" and uses these samples to generate data messages Ts which respectively relate to the same sampling time or to the same "sample counter value". The correspondingly formed messages Ts are transmitted in the direction of the station bus 220 using the further 3-port network connection 320.

When processing the phase-conductor-related samples U and I from the measurement transducers 250, the measurement and/or protective device 230 preferably carries out "downsampling". This means that the number of samples provided by the measurement transducers 250 is reduced, before they are forwarded to the station bus 220, by discarding nine out of ten samples from the measurement transducers 250, for example, and keeping only one respective single sample. If the sampling rate in the measurement transducers 250 is 10 kHz or 20 kHz, for example, only a sampling rate of 1 or 2 kHz is forwarded on the station bus in the form of the messages Ts. Despite the reduction in the sampling rate, "transparency" of the measured values—when seen from the superordinate control system 210—is nevertheless retained because, despite only every tenth sample being transmitted by the station bus 220, sufficient measured values which characterize the respective measured value situation in each of the measurement transducers 250 to a sufficient extent are still provided. The resultant transparency is diagrammatically indicated by the reference symbol V in FIG. 2.

Instead of the described reduction in the number of samples, in which only every n-th (for example n=10) sample is used further, data reduction may also take place by converting the samples into complex measured value pointers. In this variant, the measurement and/or protective device 230 uses the phase-conductor-related samples U and I received from the measurement transducers 250 to determine complex measured value pointers which indicate the magnitude and the phase of the current or voltage on the associated phase conductors.

In the case of such data reduction by means of "pointer conversion", the data rate can be reduced to a very significant extent, with the result that a transmission rate of 50 Hz, for example, suffices to characterize the measured values from the current transducers 250.

Frequency tracking can also be carried out in the measurement and/or protective device 230 or in the communication unit 300 of the measurement and/or protective device 230 by using the time-related and phase-conductor-related samples U and I from the measurement transducers 250 to first of all reconstruct the temporal profile of the respective electrical "system" signal sampled. The temporal profile reconstructed in this manner is then "resampled". Such "resampling"—that is to say repeated sampling—makes it possible to introduce another time standard, with the result that the samples relate to a new sampling clock, namely the sampling clock of the resampling operation.

Such a new time standard makes it possible to track frequencies and is expedient, for example, if transmission of the samples by the station bus 220 is intended to depend on the respective system frequency: if, for example, the system frequency of the system changes from 50 Hz to 51 Hz, the samples will be shifted relative to the temporal profile of the measurement signal in the case of a fixed sampling clock. If distribution of the samples which is matched to the respective system frequency of the measurement signal is then intended to be achieved, the communication unit 300 distributes the predefined number of samples per period over the respective period duration of the measurement signal measured and thus matches distribution of the samples to the respective system frequency. Frequency tracking may be necessary, for example, if the station bus 220 requires samples whose frequency has been tracked and if the process bus provides only samples with a fixed time.

As already mentioned, the two data buses 220 and 240 are preferably operated with a bus clock which is a great deal higher than the fundamental frequency of the measurement signals to be characterized and the system frequency of the electrical system. For example, samples can be formed in a very effective manner with a bus clock whose timing is set precisely to one microsecond.

In order to avoid the possibility of data being lost in the event of the ring structure of the two data buses 220 and 240 being interrupted, the two data buses 220 and 240 preferably operate in a full duplex mode, as already mentioned.

In summary, it can be stated that, on account of the described configuration of the measurement and/or protective device 230, the protective system 200 according to FIG. 2 makes it possible to pass through data between the process bus 240 and the station bus 220 in a virtually transparent manner, decoupling of the samples between the two data buses nevertheless being ensured by the communication unit 300; the communication unit 300 carries out—as explained—a "merging function" in this case by further processing the phase-conductor-related and time-related samples U and I provided by the measurement transducers 250 and using them to produce the sampling-time-related messages Ts for forwarding to the station bus 220. For the "merging process", the communication unit 300 is preferably equipped with one or more digital signal processors; such a signal processor is labeled, by way of example, with the reference symbol 500 in FIG. 2.

In summary, the protective system 200 according to FIG. 2 thus satisfies the following criteria:

The phase-conductor-related and time-related samples from the measurement transducers 250 are synchronized in the microsecond range an account of the use of the IEEE 1588 standard;

a deterministic response is achieved by using the described real-time Ethernet transmission method with time synchronization in accordance with IEEE 1588;

there is ring redundancy on account of the full duplex operation of the two data buses 220 and 240, thus increasing the fault tolerance;

there is decoupling between the two communication ring structures 220 and 240, to be precise with regard to decoupled transmission of the digital transducer data from the measurement transducers 250 to the superordinate control system 210;

both data buses 220 and 240 have integrated switch functionality, for example Ethernet switch functionality.

On account of the features mentioned, the protective system 200 makes it possible to transmit the samples from the measurement transducers 250, both at the process bus level and at the station bus level, in a manner that is synchronized for each sampling time. The samples are synchronized at the station bus level across all fields and are synchronized at the process bus level inside a field using all respective measurement points or measurement transducers. In this case, synchronization between the station bus 220 and the respective process bus 240 is ensured by the communication unit 300 of the measurement and/or protective device 230 which connects the two data buses 220 and 240.

LIST OF REFERENCE SYMBOLS

10 Measurement and/or protective device
20 Data line
25 Ethernet switch
30 Superordinate data bus
40 Data line
50 Data line
60 Merging unit
70 Merging unit
100 Measurement transducer
200 Protective system
210 Superordinate control system
220 Station bus
230 Measurement and/or protective device
240 Process bus
250 Measurement transducer
300 Communication unit
310 3-port network connection
320 Further 3-port network connection
330, 340 External ports of one 3-port network connection
350 An interface
360 Internal port of one 3-port network connection
400, 410 External ports of the further 3-port network connection
420 Further interface
430 Internal port of the further 3-port network connection
500 Signal processor
U, I Current and voltage samples
fi Synchronization pulse
Ts, Tp Messages

The invention claimed is:

1. A protective device, comprising:
a first interface for establishing a connection to at least one measurement transducer, the at least one measurement transducer being connected to at least one phase conductor of an electric power grid;
a second interface for connecting to a superordinate data bus; and
a communication unit directly connected to said first and second interfaces, said communication unit being directly connected to the measurement transducer through said first interface, said communication unit being connected to the superordinate data bus through said second interface, said communication unit receiving time-stamped phase-conductor-related samples from the measurement transducer for forming sampling-time-related messages and transmitting the sampling-time-related messages to the superordinate data bus, said communication unit being configured to form said sampling-time related messages by sorting the phase-conductor-related samples according to their respective time-stamps and forming a sampling-time-related message from those phase-conductor-related samples having the same time-stamp.

2. The protective device according to claim 1, wherein said first and second interfaces form data bus interfaces.

3. The protective device according to claim 2, further comprising two 3-port network connections each having two external ports and one internal port, said two external ports of a first of said 3-port network connections forming said first interface and said two external ports of a second of said 3-port network connections forming said second interface, said internal port of both of said two 3-port network connections being connected to said communication unit.

4. The protective device according to claim 3, wherein said two external ports of said first network connection are for connecting to a process bus and said two external ports of said second network connection are for connecting to the superordinate data bus being a station bus.

5. The protective device according to claim 3, wherein said communication unit and said two 3-port network connections are integrated in a freely programmable gate array.

6. The protective device according to claim 3, wherein said communication unit uses the phase-conductor-related samples applied to said internal port of one of said 3-port network connections to form the sampling-time-related messages and outputs the sampling-time-related messages to said internal port of the other one of said 3-port network connections.

7. The protective device according to claim 6, wherein said communication unit reduces a sampling rate of the phase-conductor-related samples applied to said internal port of said one network connection.

8. The protective device according to claim 7, wherein said communication unit reduces the sampling rate of the phase-conductor-related samples applied to said internal port of said one network connection by using only every n-th sample further and leaving all remaining samples out of consideration, n being greater than two.

9. The protective device according to claim 6, wherein said communication unit uses the phase-conductor-related samples applied to said internal port of said one network connection to form pointer values and uses the pointer values to form the sampling-time-related messages.

10. The protective device according to claim 6, wherein said communication unit subjects the phase-conductor-related samples applied to said internal port of said one network connection to a renewed sampling operation.

11. The protective device according to claim 10, wherein said communication unit uses the phase-conductor-related samples applied to said internal port of said one network connection to reconstruct a temporal profile of an electrical signal sampled by the measurement transducer, resamples a reconstructed signal at a second sampling rate which differs from an original sampling rate resulting, uses new samples formed to form the sampling-time-related messages and outputs the sampling-time-related messages at said internal port of said other network connection.

12. The protective device according to claim 1, wherein said communication unit has a digital signal processor for forming the sampling-time-related messages.

13. The protective device according to claim 1, wherein at least one of said first and second interfaces is compatible with at least one of a real-time Ethernet standard, an IEC 61850 standard and an IEEE 1588 standard.

14. The protective device according to claim 1, wherein with regard to information relating to the phase-conductor-related samples, said communication unit forms the sampling-time-related messages in accordance with rules of an IEC 61850 standard.

15. The protective device according to claim 14, wherein with regard to all other information, apart from the information relating to the phase-conductor-related samples, said communication unit forms the sampling-time-related messages in accordance with an IEC 61850-8-1 standard.

16. The protective device according to claim 3, wherein said two 3-port network connections are suitable for connection to a real-time Ethernet ring.

17. A protective system, comprising:
a measurement transducer connected to at least one phase conductor of an electric power grid;
a process bus;
a superordinate data bus;
a protective device, said protective device containing:
a first interface for establishing a connection to said measurement transducer;
a second interface for connecting to said superordinate data bus;
a communication unit connected to said first and second interfaces, said communication unit being directly connected to said measurement transducer through said first interface, said communication unit being connected to said superordinate data bus through said second interface, said communication unit receiving time-stamped phase-conductor-related samples from said measurement transducer for forming sampling-time-related messages and transmitting the sampling-time-related messages to said superordinate data bus, said communication unit being configured to form said sampling-time related messages by sorting the phase-conductor-related samples according to their respective time-stamps and forming a sampling-time-related message from those phase-conductor-related samples having the same time-stamp;
a first 3-port network connection having two external ports connected to said measurement transducer through said process bus; and
a second 3-port network connection having two external ports connected to said superordinate data bus being a station bus.

18. A protective device, comprising:
a first interface for establishing a connection to at least one measurement transducer, the at least one measurement transducer being connected to at least one phase conductor of an electric power grid;
a second interface for connecting to a superordinate data bus; and
a communication unit directly connected to said first and second interfaces, said communication unit being directly connected to the measurement transducer through said first interface, said communication unit being connected to the superordinate data bus through said second interface, said communication unit receiving time-stamped phase-conductor-related samples from the measurement transducer for forming sampling-time-related messages and transmitting the sampling-time-related messages to the superordinate data bus, said communication unit being configured to form said sampling-time related messages by sorting the phase-conductor-related samples according to their respective time-stamps and forming a sampling-time-related message from those phase-conductor-related samples having the same time-stamp,
said first and second interfaces forming data bus interfaces and
said protective device further including two 3-port network connections each having two external ports and one internal port, said two external ports of a first of said 3-port network connections forming said first interface and said two external ports of a second of said 3-port network connections forming said second interface, said internal port of both of said two 3-port network connections being connected to said communication unit.

19. The protective device according to claim 18, wherein said two external ports of said first network connection are for connecting to a process bus and said two external ports of said second network connection are for connecting to the superordinate data bus being a station bus.

20. The protective device according to claim 18, wherein said communication unit and said two 3-port network connections are integrated in a freely programmable gate array.

21. The protective device according to claim 18, wherein said communication unit uses the phase-conductor-related samples applied to said internal port of one of said 3-port network connections to form the sampling-time-related messages and outputs the sampling-time-related messages to said internal port of the other one of said 3-port network connections.

22. The protective device according to claim 21, wherein said communication unit reduces a sampling rate of the phase-conductor-related samples applied to said internal port of said one network connection.

23. The protective device according to claim 22, wherein said communication unit reduces the sampling rate of the phase-conductor-related samples applied to said internal port of said one network connection by using only every n-th sample further and leaving all remaining samples out of consideration, n being greater than two.

24. The protective device according to claim 21, wherein said communication unit uses the phase-conductor-related samples applied to said internal port of said one network connection to form pointer values and uses the pointer values to form the sampling-time-related messages.

25. The protective device according to claim 21, wherein said communication unit subjects the phase-conductor-related samples applied to said internal port of said one network connection to a renewed sampling operation.

26. The protective device according to claim 25, wherein said communication unit uses the phase-conductor-related samples applied to said internal port of said one network connection to reconstruct a temporal profile of an electrical signal sampled by the measurement transducer, resamples a reconstructed signal at a second sampling rate which differs from an original sampling rate resulting, uses new samples formed to form the sampling-time-related messages and outputs the sampling-time-related messages at said internal port of said other network connection.

27. The protective device according to claim 18, wherein said communication unit has a digital signal processor for forming the sampling-time-related messages.

28. The protective device according to claim 18, wherein at least one of said first and second interfaces is compatible with at least one of a real-time Ethernet standard, an IEC 61850 standard and an IEEE 1588 standard.

29. The protective device according to claim 18, wherein with regard to information relating to the phase-conductor-related samples, said communication unit forms the sampling-time-related messages in accordance with rules of an IEC 61850 standard.

30. The protective device according to claim 29, wherein with regard to all other information, apart from the information relating to the phase-conductor-related samples, said communication unit forms the sampling-time-related messages in accordance with an IEC 61850-8-1 standard.

31. The protective device according to claim 18, wherein said two 3-port network connections are suitable for connection to a real-time Ethernet ring.

\* \* \* \* \*